(12) United States Patent
Funes et al.

(10) Patent No.: US 7,792,816 B2
(45) Date of Patent: Sep. 7, 2010

(54) METHOD AND SYSTEM FOR FAST, GENERIC, ONLINE AND OFFLINE, MULTI-SOURCE TEXT ANALYSIS AND VISUALIZATION

(75) Inventors: Pablo Funes, Somerville, MA (US); Elena Popovici, Boston, MA (US); Paolo Gaudiano, Essex, MA (US); Daphna Buchsbaum, Berkeley, CA (US); Denis Garagic, Wayland, MA (US); M. Ihsan Ecemis, Boston, MA (US); Chris Bingham, Cambridge, MA (US); Eric Bonabeau, Winchester, MA (US)

(73) Assignee: Icosystem Corporation, Cambridge, MA (US)

( * ) Notice: Subject to any disclaimer, the term of this patent is extended or adjusted under 35 U.S.C. 154(b) by 363 days.

(21) Appl. No.: 12/023,693

(22) Filed: Jan. 31, 2008

(65) Prior Publication Data

US 2009/0144617 A1 Jun. 4, 2009

Related U.S. Application Data

(60) Provisional application No. 60/887,710, filed on Feb. 1, 2007.

(51) Int. Cl.
*G06F 7/00* (2006.01)
(52) U.S. Cl. .................................... 707/708
(58) Field of Classification Search .................. 707/708
See application file for complete search history.

(56) References Cited

U.S. PATENT DOCUMENTS 4,700,295 A 10/1987 Katsof et al.
4,796,194 A 1/1989 Atherton
4,935,877 A 6/1990 Koza
5,136,686 A 8/1992 Koza (Continued)

FOREIGN PATENT DOCUMENTS

EP 1235180 8/2002

(Continued)

OTHER PUBLICATIONS

Supplementary European search report for Application No. EP 04 74 9609.

(Continued)

*Primary Examiner*—Charles Rones
*Assistant Examiner*—Fazlul Quader
(74) *Attorney, Agent, or Firm*—Foley Hoag LLP (57) ABSTRACT

Methods and systems for text data analysis and visualization enable a user to specify a set of text data sources and visualize the content of the text data sources in an overview of salient features in the form of a network of words. A user may focus on one or more words to provide a visualization of connections specific to the focused word(s). The visualization may include clustering of relevant concepts within the network of words. Upon selection of a word, the context thereof, e.g., links to articles where the word appears, may be provided to the user. Analyzing may include textual statistical correlation models for assigning weights to words and links between words. Displaying the network of words may include a force-based network layout algorithm. Extracting clusters for display may include identifying "communities of words" as if the network of words was a social network.

8 Claims, 9 Drawing Sheets

Overview of system architecture.

U.S. PATENT DOCUMENTS

| | | |
|---|---|---|
| 5,148,513 A | 9/1992 | Koza et al. |
| 5,195,172 A | 3/1993 | Elad et al. |
| 5,233,513 A | 8/1993 | Doyle |
| 5,428,712 A | 6/1995 | Elad et al. |
| 5,465,221 A | 11/1995 | Merat et al. |
| 5,541,835 A | 7/1996 | Dextraze et al. |
| 5,568,590 A | 10/1996 | Tolson |
| 5,581,657 A | 12/1996 | Lyon |
| 5,617,510 A | 4/1997 | Keyrouz et al. |
| 5,708,774 A | 1/1998 | Boden |
| 5,737,581 A | 4/1998 | Keane |
| 5,761,381 A | 6/1998 | Arci et al. |
| 5,761,494 A | 6/1998 | Smedley et al. |
| 5,793,931 A | 8/1998 | Hillis |
| 5,799,304 A | 8/1998 | Miller |
| 5,809,489 A | 9/1998 | Davidor et al. |
| 5,855,015 A | 12/1998 | Shoham |
| 5,858,462 A | 1/1999 | Yamazaki et al. |
| 5,864,633 A | 1/1999 | Opsal et al. |
| 5,867,397 A | 2/1999 | Koza et al. |
| 5,890,133 A | 3/1999 | Ernst et al. |
| 5,890,146 A | 3/1999 | Wavish et al. |
| 5,897,629 A | 4/1999 | Shinagawa et al. |
| 5,930,780 A | 7/1999 | Hughes et al. |
| 5,963,447 A | 10/1999 | Kohn et al. |
| 5,963,939 A | 10/1999 | McCann et al. |
| 5,970,487 A | 10/1999 | Shackleford et al. |
| 5,978,507 A | 11/1999 | Shackleton et al. |
| 5,987,457 A | 11/1999 | Ballard |
| 6,029,139 A | 2/2000 | Cunningham et al. |
| 6,055,523 A | 4/2000 | Hillis |
| 6,088,690 A | 7/2000 | Gounares et al. |
| 6,094,652 A | 7/2000 | Faisal |
| 6,098,059 A | 8/2000 | Nordin et al. |
| 6,125,351 A | 9/2000 | Kauffman |
| 6,185,548 B1 | 2/2001 | Schwartz et al. |
| 6,236,955 B1 | 5/2001 | Summers |
| 6,249,714 B1 | 6/2001 | Hocaoglu et al. |
| 6,253,200 B1 | 6/2001 | Smedley et al. |
| 6,282,527 B1 | 8/2001 | Gounares et al. |
| 6,321,205 B1 | 11/2001 | Eder |
| 6,327,582 B1 | 12/2001 | Worzel |
| 6,336,110 B1 | 1/2002 | Tamura et al. |
| 6,349,238 B1 | 2/2002 | Gabbita et al. |
| 6,408,263 B1 | 6/2002 | Summers |
| 6,411,373 B1 | 6/2002 | Garside et al. |
| 6,424,358 B1 | 7/2002 | DiDomizio et al. |
| 6,430,545 B1 | 8/2002 | Honarvar et al. |
| 6,434,435 B1 | 8/2002 | Tubel et al. |
| 6,434,492 B1 | 8/2002 | Pollack et al. |
| 6,434,542 B1 | 8/2002 | Farmen et al. |
| 6,449,761 B1 | 9/2002 | Greidinger et al. |
| 6,468,770 B1 | 10/2002 | Keyes et al. |
| 6,480,832 B2 | 11/2002 | Nakisa et al. |
| 6,484,166 B1 | 11/2002 | Maynard |
| 6,490,566 B1 | 12/2002 | Schmidt |
| 6,513,024 B1 | 1/2003 | Li |
| 6,523,016 B1 | 2/2003 | Michalski |
| 6,528,715 B1 | 3/2003 | Gargi |
| 6,571,282 B1 | 5/2003 | Bowman-Amuah |
| 6,576,919 B1 | 6/2003 | Yoshida et al. |
| 6,636,848 B1 | 10/2003 | Aridor et al. |
| 6,662,167 B1 | 12/2003 | Xiao |
| 6,671,628 B2 | 12/2003 | Hurst |
| 6,678,618 B1 | 1/2004 | Schwartz et al. |
| 6,709,330 B1 | 3/2004 | Klein et al. |
| 6,721,647 B1 | 4/2004 | Kita et al. |
| 6,741,959 B1 | 5/2004 | Kaiser |
| 6,745,184 B1 | 6/2004 | Choi et al. |
| 6,760,335 B1 | 7/2004 | Andersson et al. |
| 6,763,354 B2 | 7/2004 | Hosken et al. |
| 6,848,104 B1 | 1/2005 | Van Ee et al. |
| 6,865,571 B2 | 3/2005 | Inaba et al. |
| 6,882,988 B2 | 4/2005 | Subbu et al. |
| 6,895,286 B2 | 5/2005 | Kaji et al. |
| 6,895,396 B2 | 5/2005 | Schwartz et al. |
| 6,895,405 B1 | 5/2005 | Choi et al. |
| 6,912,587 B1 | 6/2005 | O'Neil |
| 6,928,434 B1 | 8/2005 | Choi et al. |
| 6,934,405 B1 | 8/2005 | Schuessler et al. |
| 6,937,993 B1 | 8/2005 | Gabbita et al. |
| 6,941,287 B1 | 9/2005 | Vaidyanathan et al. |
| 6,947,844 B2 | 9/2005 | Steitz et al. |
| 6,947,845 B2 | 9/2005 | Steitz et al. |
| 6,947,930 B2 | 9/2005 | Anick et al. |
| 6,950,270 B2 | 9/2005 | Lyle et al. |
| 6,950,712 B2 | 9/2005 | Ulyanov et al. |
| 6,952,650 B2 | 10/2005 | Steitz et al. |
| 6,952,700 B2 | 10/2005 | Modha et al. |
| 6,957,200 B2 | 10/2005 | Buczak et al. |
| 6,996,560 B1 | 2/2006 | Choi et al. |
| 7,000,700 B2 | 2/2006 | Cairns et al. |
| 7,003,504 B1 | 2/2006 | Angus et al. |
| 7,003,516 B2 | 2/2006 | Dehlinger et al. |
| 7,003,560 B1 | 2/2006 | Mullen et al. |
| 7,007,006 B2 | 2/2006 | Zilio et al. |
| 7,013,238 B1 | 3/2006 | Weare |
| 7,035,740 B2 | 4/2006 | Kermani |
| 7,043,463 B2 | 5/2006 | Bonabeau et al. |
| 7,047,169 B2 | 5/2006 | Pelikan et al. |
| 7,070,647 B2 | 7/2006 | Fujimori et al. |
| 7,076,475 B2 | 7/2006 | Honarvar |
| 7,110,888 B1 | 9/2006 | Nicholls |
| 7,117,202 B1 | 10/2006 | Willoughby |
| 7,127,695 B2 | 10/2006 | Huang et al. |
| 7,139,665 B2 | 11/2006 | Datta et al. |
| 7,181,438 B1 | 2/2007 | Szabo |
| 7,190,116 B2 | 3/2007 | Kobayashi et al. |
| 7,191,164 B2 | 3/2007 | Ray et al. |
| 7,194,461 B2 | 3/2007 | Kawatani |
| 7,280,986 B2 | 10/2007 | Goldberg et al. |
| 7,333,960 B2 | 2/2008 | Bonabeau et al. |
| 7,356,518 B2 | 4/2008 | Bonabeau et al. |
| 7,457,678 B2 | 11/2008 | Smith et al. |
| 7,491,494 B2 | 2/2009 | Liu et al. |
| 2001/0003824 A1 | 6/2001 | Schnier |
| 2002/0083031 A1 | 6/2002 | De Varax |
| 2002/0156773 A1 | 10/2002 | Hildebrand et al. |
| 2002/0161747 A1 | 10/2002 | Li et al. |
| 2002/0174126 A1 | 11/2002 | Britton et al. |
| 2003/0033287 A1* | 2/2003 | Shanahan et al. .............. 707/3 |
| 2003/0088458 A1 | 5/2003 | Afeyan et al. |
| 2004/0010479 A1 | 1/2004 | Ali |
| 2004/0117333 A1 | 6/2004 | Voudouris et al. |
| 2004/0117355 A1 | 6/2004 | Lef et al. |
| 2004/0133355 A1 | 7/2004 | Schneider |
| 2004/0139058 A1* | 7/2004 | Gosby et al. .................. 707/3 |
| 2004/0162738 A1 | 8/2004 | Sanders et al. |
| 2004/0204957 A1 | 10/2004 | Afeyan et al. |
| 2004/0243388 A1 | 12/2004 | Corman et al. |
| 2004/0254901 A1 | 12/2004 | Bonabeau et al. |
| 2005/0005232 A1* | 1/2005 | Gosby ....................... 715/500 |
| 2005/0119983 A1 | 6/2005 | Bonabeau et al. |
| 2005/0165763 A1 | 7/2005 | Li et al. |
| 2005/0187926 A1 | 8/2005 | Britton et al. |
| 2005/0198026 A1 | 9/2005 | Dehlinger et al. |
| 2005/0261953 A1 | 11/2005 | Malek et al. |
| 2006/0010117 A1 | 1/2006 | Bonabeau et al. |
| 2006/0167862 A1 | 7/2006 | Reisman |
| 2008/0040671 A1 | 2/2008 | Reed |

FOREIGN PATENT DOCUMENTS

| | | |
|---|---|---|
| WO | WO-00/02136 | 1/2000 |

| WO | WO-00/02138 | 1/2000 |
| WO | WO-00/54185 | 9/2000 |
| WO | WO-02/27541 | 4/2002 |

OTHER PUBLICATIONS

Supplementary European search report for Application No. EP 04 78 2505.
Bentley, P. J. et al "New Trends in Evolutionary Computation", *Evolutionary Computation, 2001*. Proceedings of the 2001 Congress on May 27-30, 2001 Piscataway, NJ, USA, IEEE, vol. 1, pp. 162-169.
Kosorukoss, Alex , "Human Based Genetic Algorithm" 2001 IEEE International Conference on Systems Man and Cybernetics. SMC 2001. Tucson, AZ, Oct. 7-10, 2001; vol. 5, pp. 3464-3469.
Giacinto et al., "Instanced-based Relevance Feedback for Image Retrieval", 2004, pp. 1- 8.
Klabbankoh et al., "Applied genetic Algorithms in Information Retrieval", 1999, pp. 1-6.
Kraft et al., "The Use of Genetic Programming to build queries for Information Retrieval", IEEE, 1994, pp. 468-473.
Lopez-Pujalte et al., "Genetic algorithms in relevance feedback: a second test and new contributions", Information Processing and Management, vol. 39, 2003, pp. 669-687.
MacArthur et al., "Relevance Feedback Decision Trees in Content-based Image Retrieval", Proceedings of the IEEE Workshop on Content-based Access of Image and Video Libraries, 2000, pp. 1-5.
Meilhac et al., "Relevance Feedback and Category Search in Image Databases", 1999 pp. 1-7.
Sciascio et al., "Content-based Image Retrieval over the Web using Query by Sketch and Relevance Feedback", Proceedings of 4th International Conference on Visual Information System, 1999, p. 123-130.
Smith et al., "The use of genetic programming to build Boolean queries for text retrieval through relevance feedback", Journal of Information Science, vol. 23, No. 6, 1997, pp. 423-431.
Stejic et al., "Genetic algorithm-based relevance feedback for image retrieval using local similarity patterns", Information Processing and Management, vol. 39, 2003, pp. 1-23.
Xin et al., "Relevance Feedback for Content-based Image Retrieval using Bayesian Network", The Pan-Sydney Area Workshop on Visual Information Processing, 2003, pp. 1-4.
Yang et al., "Query Optimization in Information retrieval Using Genetic Algorithms", Proceedings of the 5th International Conference on Genetic Algorithms, 1993, pp. 603-613.
Zhou et al., "Relevance feedback in image retrieval: A comprehensive review", Springer-Verlag 2003, pp. 536-544.
Tasoulis, D.K. et al. "The new window density function for efficient evolutionary unsupervised clustering" *Evolutionary Computation, 2005.* The 2005 IEEE congress on vol. 3, Sep. 2-5, 2005, pp. 2388-2394
Anderson, C., et al., "Evolutionary Testing as Both a Testing and Redesign Tool: a Study of a Shipboard Firemain's Valve and Pump Controls", Evolution Computation, 2004. CEC2004. Congress on vol. 1, Jun. 19-23, 2004 pp. 1089-1097 vol. 1.
Anderson, C., et al "Modeling, Quantifying and Testing Complex Aggregate Service Chains", Web Services, 2005. ICWS 2005. Proceedings. 2005 IEEE International Conference on Jul. 11-15, 2005 Publication pp. 274-281 vol. 1 (Our pp. 1-8).
Ashburn, T., et al., "Interactive Inversion of Financial Markets Agent-Based Models", Evolutionary Computation, 2004. CEC 2004. Congress on vol. 1, Jun. 19-23, 2004 pp. 522-529 vol. 1.
Bäck, Thomas, et al., "Handbook of Evolutionary Computation," 1997, Publishing Ltd. and Oxford University Press, p. 14, lines 15-16. (A1.3 Advantages (and disadvantages) of evolutionary computation over other approaches).
Baeza-Yates R., et al: "Modern Information Retrieval, Chapter 5: Query Operations" Modern Information Retrieval, Harlow: Addison-Wesley, GB, 1999, pp. 117-139, XP002311981, ISBN: 0-201-39829-X.
Banks, Jerry, "Discrete-Event System Simulation, " Second Edition, 1996, Prentice-Hall, Upper Saddle River, New Jersey, p. 3-55, 1 Introduction to Simulation.
Banks, Jerry, "Handbook of Simulation: Principles, Methodology, Advances, Applications, and Practice," 1998, John Wiley & Sons, Inc., New York, New York. p. 15, line 15-22, 1.7 Steps in a Simulation Study.
Banzhaf, Wolfgang, et al., "Genetic Programming: An Introduction on the Automatic Evolution of Computer Programs and Its Applications," 1998, Morgan Kaufmann Publishers, Inc., San Francisco, California, p. 14, 1 Genetic Programming as Machine Learning.
Beasley D, et al.: "An Introduction to Genetic Algorithms", Vivek, National Centre for Softwre Technology, Bombay, In, vol. 7, No. 1, pp. 3-19, XPoo1061908, ISSN: 0970-8618.
Buchsbaum, D. et al "Designing Collective Behavior in a Group of Humans Using a Real-Time Polling System and Interactive Evolution", Swarm Intelligence Symposium, 2005. SIS 2005. Proceedings 2005 IEEE Jun. 8-10, 2005 Publication pp. 15-21 (Our pp. 1-13).
Carrano, E.G., et al., "Electric Distribution Network Multiobjective Design Using a Problem-Specific Genetic Algorithm", Power Delivery, IEEE Transactions on vol. 21, Issue 2, Apr. 2006 pp. 995-1005 Digital Object Identifier 10.1109/TPWRD.2005.858779.
Cortinas, Marty; "HPS to remodel Ithink simulator." (High Performance Systems Inc's Ithink 5.0 business-modeling, simulation software) (Product Announcement). MacWEEK, v11, n26, p. 29(2), Jul. 7, 1997.
Cranfield, et al., "Exposure of magnetic bacteria to simulated mobile phone-type RF radiation has no impact on mortality," Nanobioscience, IEEE Transactions on vol. 2, Issue 3, Sep. 2003 pp. 146-149, Digital Object Identifier 10.1009/TNB.2003.816227.
Dasheng Liu, et al., "A Multiobjective Memetic Algorithm Based on Particle Swarm Optimization", Systems, Man and Cybernetics, Part B, IEEE Transactions on vol. 37, Issue 1, Feb. 2007 pp. 42-50 Digital Object Identifier 10. 1109/TSMCB.2006.883270.
De Moor, B., et al., "A Geometrical Approach to the Maximal Corank Problems in the Analysis of Linear Relations", Decision and Control, 1986 25th IEEE Conference on vol. 25, Part 1, Dec. 1986 pp. 1990-1995.
Dong-Hyeok Cho, et al., "Multiobjective Optimal Design of Interior Permanent Magnet Synchronous Motors Considering Improved Core Loss Formula", IEEE Transactions on Energy Conversion, vol. 14, Issue 4, Dec. 1999 pp. 1347-1352 Digital Object Identifier 10.1109/60.815071.
Dong-Joon Sim, et al., "Application of Vector Optimization Employing Modified Genetic Algorithm to Permanent Magnet Motor Design", Magnetics, IEEE Transactions on vol. 33, Issue 2, part 2, Mar. 1997 p. 1888-1891 Digital Object Identifier 10.1109/20. 582654.
Esbensen, H., et al., "Design Space Exploration Using the Genetic Algorithm," Circuit and Systems, 1996. ISCAS '96., 'Connecting the World'., 1996 IEEE International Symposium on vol. 4, May 12-15, 1996 pp. 500-503 vol. 4 Digital Object Identifier 10.1 109/ISCAS. 1996.542010.
Ferber, Jacques, "Multi-Agent Systems: An Introduction to Distributed Artificial Intelligence," 1999, Addison Wesley Longman Limited, Harlow, Essex, England, p. 1-48, 1 Principles of Multi-Agent Systems.
Funes, P., et al., "Interactive Multi-Participant Tour Allocation", Evolutionary Computation, 2004. CEC2004. Congress on vol. 2, Jun. 19-23, 2004 pp. 1699-1705 vol. 2.
Gaudiano, P. et al "Evolving Behaviors for a Swarm of Unmanned Air Vehicles", Swarm Intelligence Symposium, 2005. SIS 2005. Proceedings 2005 IEEE Jun. 8-10, 2005 Publication pp. 317-324 (Our pp. 1-6, 13, 14).
Gopinath, D., et al., "An Integrated Methodology for Multiobjective Optimal Component Placement and Heat Sink Sizing", Components and Packaging Technologies, IEEE Transactions on [see also Components, Packaging and Manufacturing Technology, Part A: Packaging Technologies, IEEE Transactions on] vol. 28, Issue 4, Dec. 2005 p. 869 -876.
Hu Guoqiang, et al., "Multiobjective Optimization Scheduling Based on Fuzzy Genetic Algorithm in Cascaded Hydroelectric Stations", Transmission and Distribution Conference and Exhibition: Asia and Pacific, 2005 IEEE/PES 2005 p. 1-4 Digital Object Identifier 10.1 109/TDC.2005.1547075.

International Search Report for International Application No. PCT/US2005/023884.

International Search Report and Written Opinion for PCT/US06/36765.

Ishibushi, H., et al., "Comparison Between Single-Objective and Multi-Objective Genetic Algorithms: Performance Comparison and Performance Measures", Evolutionary Computation, 2006. CEC 2006. IEEE Congress on Jul. 16-21, 2006 pp. 1143-1150.

Kaltofen, E., et al., "Processor-Efficient Parallel Solution of Linear Systems. II. The Positive Characteristic and Singular Cases" Foundations of Computer Science, 1992. Proceedings., 33rd Annual Symposium on Oct. 24-27, 1992 pp. 714-723.

Kato, K., et al., "Large Scale Fuzzy Multiobjective 0-1 Programs Through Genetic Algorithms with Decomposition Procedures", Knowledge-Based Intelligent Electronic Systems, 1998. Proceedings KES '98. 1998 Second International Conference on vol. 1, Apr. 21-23, 1998 pp. 278-284 vol. 1 Digital Object Identifier 10.1109/KES.1998.725859.

Kumar, R., et al., "Assessing the Convergence of Rank-Based Multiobjective Genetic Algorithms", Genetic Algorithms in Engineering Systems: Innovations And Applications, 1997. GALESIA 97. Second International Conference on (Conf. Publ. No. 446) Sep. 2-4, 1997 pp. 19-23.

Li-Cun Fang, et al., "Concurrent Optimization for Parameters of Powertrain and Control System of Hybrid Electric Vehicle Based on Multi-Objective Genetic Algorithms", SICE-ICASE, 2006. International Joint Conference Oct. 2006 p. 2424-2429 Digital Object Identifier 10.1109/SICE.2006.315114.

Li Mingqiang, et al., "GA-Based Multi-Objective Optimization" Intelligent Control and Automation, 2000. Proceedings of the 3rd World Congress on vol. 1, Jun.28-Jul. 2, 2000 p. 637-640 vol. 1 Digital Object Identifier 10.1109/WCICA.2000.860050.

Linkens, D.A., et al. "A Distributed Genetic Algorithm for Multivariable Fuzzy Control", Genetic Algorithms for Control Systems Engineering, IEEE Colloquium on May 28, 1993 pp. 9/1-9/3.

Maceachern, L.A., "Constrained Circuit Optimization Via Library Table Genetic Algorithms" Circuits and Systems, 1999. ISCAS '99. Proceedings of the 1999 IEEE International Symposium on vol. 6, May 30-Jun. 2, 1999 pp. 310-313 vol. 6 Digital Object Identifier 10.1109/ISCAS.1999.780157.

Malinchik, S., "Interactive Exploratory Data Analysis", Evolutionary Computation, 2004. CEC2004. Congress on vol. 1, Jun. 19-23, 2004 pp. 1098-1104 vol. 1.

Michalewicz, Zbigniew, "Genetic Algorithms + Data Structures = Evolution Programs," Third, Revised and Extended Edition, 1996, Springer-Verlag Berlin Heidelberg, p. 13-31, GAs: What Are They?.

Micro Saint 3.2 (278548); Micro Analysis & Design Inc., 4900 Pearl East Cir. #201 E, Boulder, CO 80301, Jan. 1986.

Moss, Scott, et al., "Lecture Notes in Artificial Intelligence: Subseries of Lecture Notes in Computer Science: Multi-Agent-Based Simulation," Second International Workshop, MABS 2000, Boston, Massachusetts, Jul., Revised and Additional Papers, Springer-Verlag Berlin Heidelberg, p. 1-26, Editorial Introduction: Messy Systems—The Target for Multi Agent Based Simulation.

Pollack, J., et al., "Coevolutionary Robotics" Evolvable Hardware, 1999. Proceedings of the First NASA/DoD Workshop on Jul. 19-21, 1999 pp. 208-216.

Pu Han, et al., "A Multi-Objective Genetic Programming/NARMAX Approach to Chaotic Systems Identification", Intelligent Control and Automation, 2006. WCICA 2006. The Sixth World Congress on vol. 1, 2006 pp. 1735-1739 Digital Object Identifier 10.1109/WCICA.2006.1712650.

Rodriguez-Vazquez, K. et al., "Multi-Objective Genetic Programming for Nonlinear System Identification", Electronics Letters vol. 34, Issue 9, Apr. 30, 1998 pp. 930-931.

Ronald, S., "Duplicate genotypes in a genetic algorithm," Evolutionary Computation Proceedings, 1998. IEEE World Congress on Computational Intelligence., The 1998 IEEE International Conference on May 4-9, 1998 pp. 793-798, Digital Object Identifier 10.1 109/ICEC.1998.700153.

Sakawa, M., et al., "An Interactive Fuzzy Satisficing Method for Multiobjective Nonconvex Programming Problems With Fuzzy Numbers Through Coevolutionary Genetic Algorithms" Systems, Man and Cybernetics, Part B, IEEE Transactions on vol. 31, Issue 3, Jun. 2001 pp. 459-467 Digital Object Identifier 10.1109/3477.931546.

Srinivas, M., et al.: "Genetic Algorithms: A Survey" Computer, IEEE Service Center, Los Alamitos, CA, US, vol. 27, No. 6, Jun. 1, 1994, pp. 17-26, XP000438318, ISSN: 0018-9162.

Tan, K.C., et al., "Enhanced Distribution and Exploration for Multiobjective Evolutionary Algorithms", Evolutionary Computation, 2003. CEC '03. The 2003 Congress on vol. 4, Dec. 8-12, 2003 pp. 2521-2528 vol. 4 Digital Object Identifier 10.1109/CEC.2003.1299405.

Then, T.W., et al., "Genetic Algorithms in Noisy Environment", Intelligent Control, 1994., Proceedings of the 1994 IEEE International Symposium on Aug. 16-18, 1994 pp. 225-230 Digital Object Identifier 10.1109/ISIC.1994.367813.

Trifonov, I., et al "Resource Allocation for a Distributed Sensor Network", Swarm Intelligence Symposium, 2005. SIS 2005. Proceedings 2005 IEEE Jun. 8-10, 2005 Publication pp. 428-431 (Our pp. 1-4).

Valenzuela, Christine L, "A Simple Evolutionary Algorithm for Multi-Objective Optimization (SEAMO)," Evolutionary Computation, 2002, 1:717-722 (2002).

Van Der Meche, E., "Nevanlinna-Pick Interpolation with Degree Constraint: Complete Parameterization Based on Lyapunov Inequalities", Decision and Control, 2004. CDC. 43rd IEEE Conference on vol. 1, Dec. 14-17, 2004 pp. 411-416 vol. 1.

Van Veldhuizen, David A., "Issues in Parallelizing Multiobjective Evolutionary Algorithms for Real World Applications," Proceedings of the 17th Symposium on Proceedings of the 2002 ACM Symposium on applied computing, Mar. 2002, pp. 595-602.

Wang, Jihua et al., "An Optimization-Based Algorithm for Job Shop Scheduling," University of Connecticut, Dept. of Electrical Engineering Publishing, MSL Papers, Mar. 28, 2004, p. 10.

Zeigler, Bernard P., et al., "Theory of Modeling Simulation, Second Edition, Integrating Discrete Event and Continuous Complex Dynamic Systems," 2000, Academic Press, San Diego, California, p. 3-53, 1 Introduction to Systems Modeling Concepts.

Brunner, B; Berrien, I;Using Semantic Graphs in Clustering Process: Enhance Information Level—Web Intellegence, 2004. WI 2004. Proceedings. IEEE/WIC/ACM International Conference on Sep. 20-24, 2004 pp. 221-227; Digital Object Identifier 10.1109/WI.2004.10106.

Kupinski, MA.; Anastasio, M.A.; Multiobjective genetic optimization of diagnostic classifiers with implications for generating receiver operating characteristic curves—Medical Imaging, IEEE Transactions on vol. 18, Issue 8, Aug. 1999 pp. 675-685 Digital Object Identifier 10.1109/42.796281.

Fridman, A.; Grote, R.; Weber, S.; Dandekar, K.R.; Kam, M.; Robust optimal power control for ad hoc networks—Information Sciences and Systems, 2006 40th Annual Conference on Mar. 22-24, 2006 pp. 729-733 Digital Object Identifier 10.1109/CISS.2006.286562.

International Search Report for PCT/US2007/072101.

International Search Report and Written Opinion for PCT/US04/24616.

International Search Report and Written Opinion for PCT/US06/38134.

International Search Report and Written Opinion for PCT/US08/52780.

Cordon et al., "Evolutionary Learning of Boolean Queries by Multiobjective Genetic programming", springer-Verlag Berlin Heidelberg 2002, pp. 710-719, accessed online at <http://www.springerlink.com/content/1k1yyxfp7c4tq4he/fulltext.pdf> on Nov. 25, 2008.

Horng et al., "Applying Genetic Algorithms to Query Optimization in Document Retrieval", Information Processing and Management 36: 2000, pp. 737-759, Accessed Online at <http://www.sciencedirect.com/science>, on Nov. 25, 2008.

Pathak et al., "Effective Information Retrieval using Genetic Algorithms based Matching Functions Adaptation", Proceeding of the 33rd Hawaii International Conference on System Sciences, IEEE: 2000, pp. 1-8, Accessed online at <http://citeseerx.inst.psu.edu/viewdoc/summary?doi+10.1.1.104.1413> on Nov. 25, 2008.

Honma, Masaki et al., "Knowledge Refinement Approach through Incorporating Case-based Knowledge in Maintenance Engineer Scheduling AI System"; Systems, Man, and Cybernetics, 1999. IEEE SMC '99 Conference Proceedings. 1999 IEEE International Conference on vol. 5, Oct. 12-15, 1999 pp. 814-819 vol. 5.

Ioannidis, Stratos et al. "Fuzzy Supervisory Control of Manufacturing Systems", Robotics and Automation, IEEE Transactions on vol. 20, Issue 3, Jun. 2004 pp. 379-389.

Tao, Yongcai et al., "Adaptive Multi-round Scheduling Strategy for Divisible Workloads in Grid Environments", Information Networking, 2009. !ICOIN 2009. International Conference on Jan. 21-24, 2009 pp. 1-5.

Tsourveloudis, Nikos et al., "Work-in-Process Scheduling by Evolutionary Tuned Distributed Fuzzy Controllers", Robotics and Automation, 2006. ICRA 2006 IEEE International Conference on May 15-19, 2006 pp. 1420-1425.

International Search Report and Written Opinion for PCT/US09/42594.

* cited by examiner

Overview of system architecture.

Fig. 1

| Name | No. of Entries | URL |
|---|---|---|
| BBC | 25 | http://newsrss.bbc.co.uk/rss/spanish/news/... |
| EFE | 0 | http://rss.efeservicios.com/rss/feed.aspx?id... |
| El_País | 15 | http://www.elpais.es/rss/feed.html?feedId=... |
| LaJornada | 10 | http://www.jornada.unam.mx/rss/mundo.xml |
| La_Nación | 37 | http://www.lanacion.com.ar/herramientas/rs... |
| Prensa_Latina | 20 | http://www.prensa-latina.cu/rss/topstories/ |
| Reforma | 3 | http://www.reforma.com/rss/portada.xml |

[ Remove selected ] [ Load file ] [ Save as... ] [ Save ]

Enter new RSS feed: Name [ ] URL [ ] [ Add ]

RSS feeds

Word network obtained from RSS feeds of Figure 2.

Word Clusters upon focusing on "lula."

Cluster function with one cluster highlighted.
Fig. 6A

Cluster function with another cluster highlighted.

Fig. 6B

Window pop up.

Browser window opening at story's URL.

METHOD AND SYSTEM FOR FAST, GENERIC, ONLINE AND OFFLINE, MULTI-SOURCE TEXT ANALYSIS AND VISUALIZATION

FIELD

This disclosure relates to a method and system that enables the user of a computational or communications device such as a computer, a smart phone, a personal digital assistant or any similar device, to visualize and analyze structured or unstructured text data from one or multiple sources.

BACKGROUND

Users of computational devices such as computers, smart phones, personal digital assistants and the like may have access to very large quantities of data. A small fraction of the data may reside on the device itself while the vast majority of the data may be stored in databases and/or may be accessible via means of communications such as the Internet, or other wired or wireless networks capable of transmitting data.

Search engines have made the discovery and retrieval of useful and relevant data a little bit easier, but often cannot help users make sense of the data. Search results may include results that do not relate to the user's search, making the search experience sometimes overwhelming. There is therefore a need for a method and system to analyze data quickly and display its essence in a succinct but holistic manner that highlights important themes, topics or concepts in the data and how they might relate. Such a method may aid the user in making sense of data.

Text mining and analysis is a rich field of study [M. W. Berry, Survey of Text Mining: Clustering, Classification, and Retrieval, Springer, 2003]. Proposed solutions to make sense of text data may rely on combinations of statistical and rule-based methods. Many methods may be computation intensive, particularly methods that attempt to include semantics, taxonomies or ontologies into the analysis, as well as methods that require the performance of global computations such as the calculation of eigenvalues and eigenvectors for extremely large matrices. As a result such methods may be used mostly by specialists.

Another characteristic of methods that rely on semantics is their context and language dependence. There is therefore a need for a method and system that is generic enough that it can work with virtually any context and with a broad range of languages without any modification of the method.

Several methods use a network approach but may fail in their genericity, speed and ease-of-use [Carley, Kathleen. (1997) Network Text analysis: The Network Position of concepts. *Text Analysis for the Social Sciences: Methods for Drawing Statistical Inferences from Texts and Transcripts*, 79-100. Mahway, N.J.: Lawrence Erlbaum Associates; Corman S R, Kuhn T, McPhee R D, Dooley K J. Studying complex discursive systems: Centering resonance analysis of communication. Human Communication Research 2002; 28: 157-206].

SUMMARY

This disclosure relates to a method and system that enables the user of a computational or communications device such as a computer, a smart phone, a personal digital assistant or any similar device, to (1) specify one or several sources of structured or unstructured text data (for example, a file in a format that supports text, such as Word, PDF, Postscript, HTML, TXT, RTF, XML, email or any other; URL; RSS feeds; URLs returned by a search query submitted to a search engine), (2) analyze the ensemble of text formed by the specified text data source or sources, and (3) display a network of words that represents certain salient features of the specified text data source or sources.

The number of words displayed can be defined by the user.

The method and system work fast and are generic. That is, they work with any text in any written language that has words, or whose text can be tokenized into word-like elements, and they work in any context, i.e., for a medical report or for the news of the day.

While the performance of the method and system may vary as a function of the specific set of text data sources, the method and system produce a useful view of the key concepts in the text and how they relate to one another. They can be used by anyone wishing to analyze a document (for example, a Senate report, a book or a set of articles), a website, news, email or other textual material, to obtain a fast global overview of the data.

The method and system work in such a way that the data sources specified may reside on the computational device itself or may be accessible via communications protocols, or a combination of both, thereby seamlessly integrating the user's offline and online universes. By right-clicking on any word in the displayed word network (or taking an equivalent defined action), the user has access to all occurrences of the selected word in the data sources, viewed in the various contexts in which it has appeared. By left-clicking on any word (or taking an equivalent defined action), the user can hide, delete or focus on the word; focusing on the word means that a new network of words is displayed that centers on the selected word, with all words in the new word network connecting to the selected word. The user can also decide to view clusters in the word network, each cluster corresponding to a theme or topic in the data.

The disclosed method and system for text data analysis and visualization enables a user of a computational device to specify a set of text data sources in various formats, residing on the device itself or accessible online, and visualize the content of the text data sources in a single overview of salient features in the form of a network of words. The method for text analysis uses a statistical correlation model for text that assigns weights to words and to links between words. The system for displaying a representation of the text data uses a force-based network layout algorithm. The method for extracting clusters of relevant concepts for display consists of identifying "communities of words" as if the network of words were a social network. Each cluster so identified usually represents a specific topic or sub-topic, or a set of tightly connected concepts in the text data.

One object of the invention is to enable the user to analyze one or more documents in any format that supports text data. The user specifies the location(s) of the document(s) and the systems parses and analyzes the document as described for the news reader example, and displays the salient features as a network of words using the same method.

Another object of the invention is to enable the user to perform a search and visualize the contents of the search results pages as a network of words. The user enters a search query, whereupon the system hands the query over to one or several search engines such as Alexa, Google, Yahoo, MSN, Technorati, or others, via open Application Programming Interfaces, collects the results, opens the URLs or documents returned by the search engine(s), parses the text data, analyzes it and displays the salient features a network of words using the same method.

BRIEF DESCRIPTION OF THE DRAWINGS

These and other features and advantages of the invention(s) disclosed herein will be more fully understood by reference to the following detailed description, in conjunction with the attached drawings.

DETAILED DESCRIPTION OF EXEMPLARY EMBODIMENTS

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the disclosed systems or methods.

Making sense of large amounts of data across a wide range of offline or online sources has become a daily routine for large numbers of users who have a lot of data on their computer or other computational or communications device and also have access to an ever-increasing online world. A significant fraction of this data is textual. The disclosure herein makes it easy for anyone with a computer or other computational or communications device and access to a database or network connection to specify one or more sources of textual data (for example, a file in a format that supports text, such as Word, PDF, Postscript, HTML, TXT, RTF, XML, email or any other; URL; RSS feeds; URLs returned by a search query submitted to a search engine) and see a visual representation of the text data as a network of words that extracts salient features from the text data. The user can then view different clusters of words that represent salient topics in the text data. The user may also focus on one word, for example by mouse-clicking on it (or by a similar or analogous operation), to see which other words or clusters the selected word is connected to.

Users also my access textual data and information from a range of other computational devices, such as PDAs, smartphones or other devices yet to appear in the marketplace. The method and system described here will work with all such devices and this disclosure covers such applications.

For illustrative purposes and without limitation, the methods and systems are described herein in relation to RSS feeds as text data sources.

Figure 1:
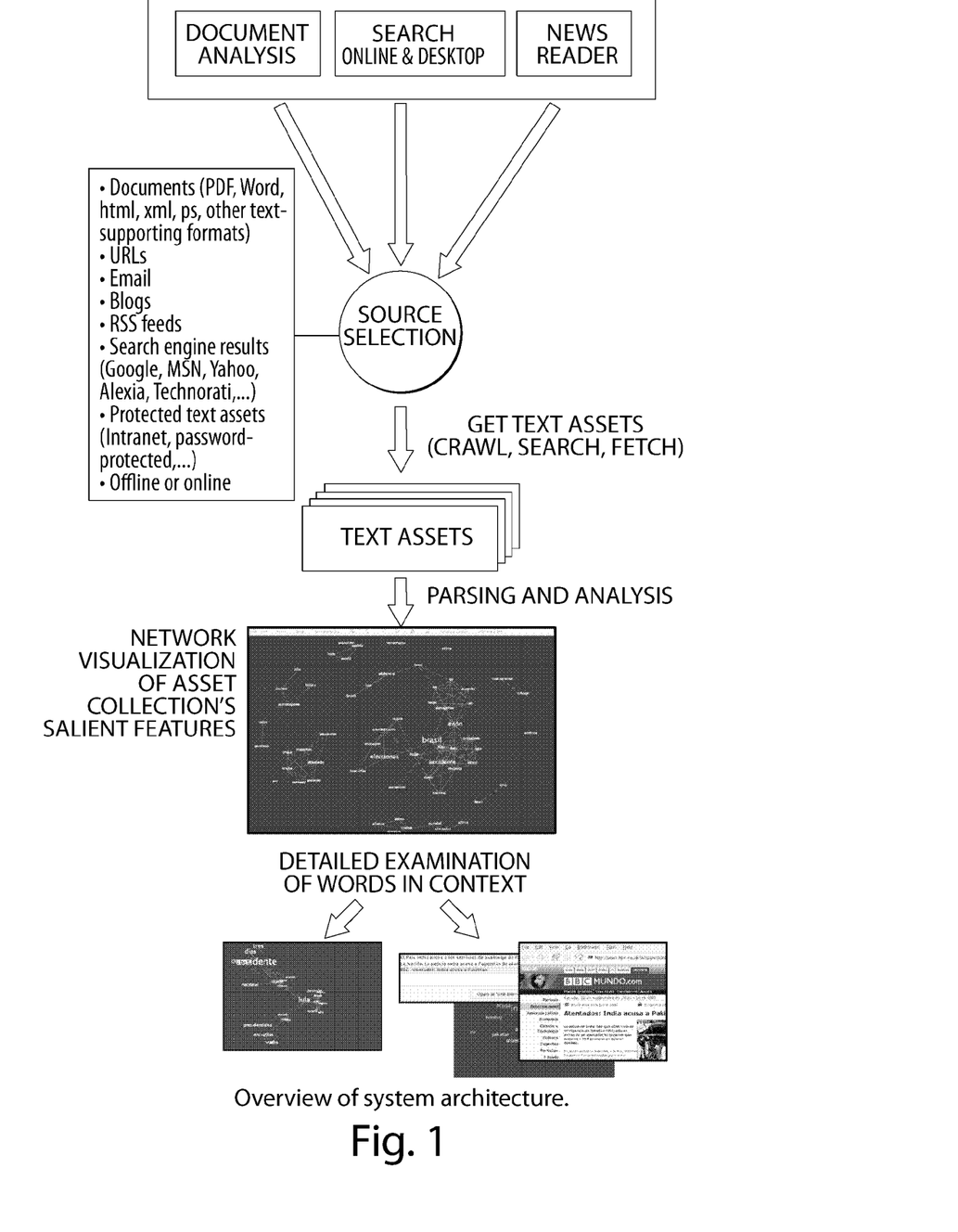
FIG. 1 is a schematic overview representation of an exemplary system architecture.
Figure 2:
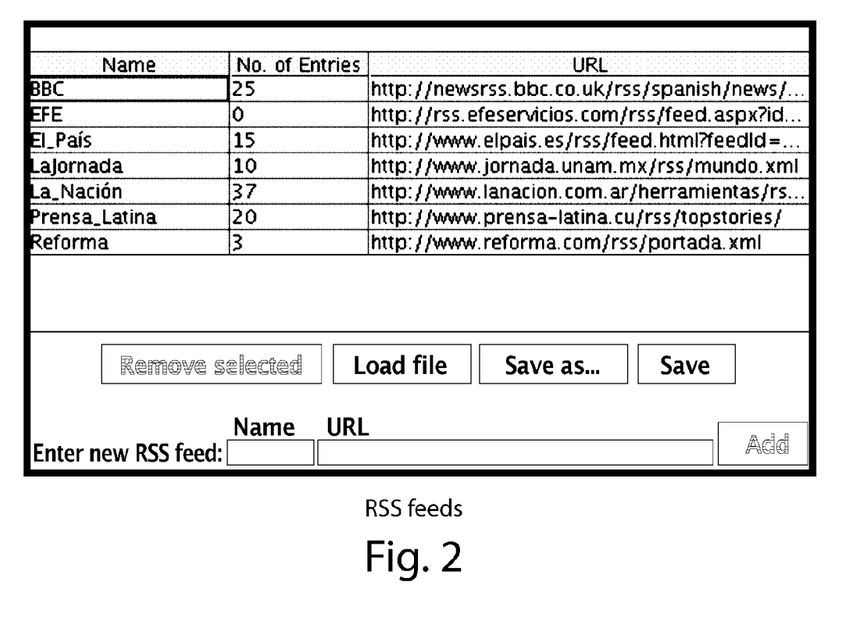
FIG. 2 illustrates an exemplary set of RSS feeds.
Figure 3:
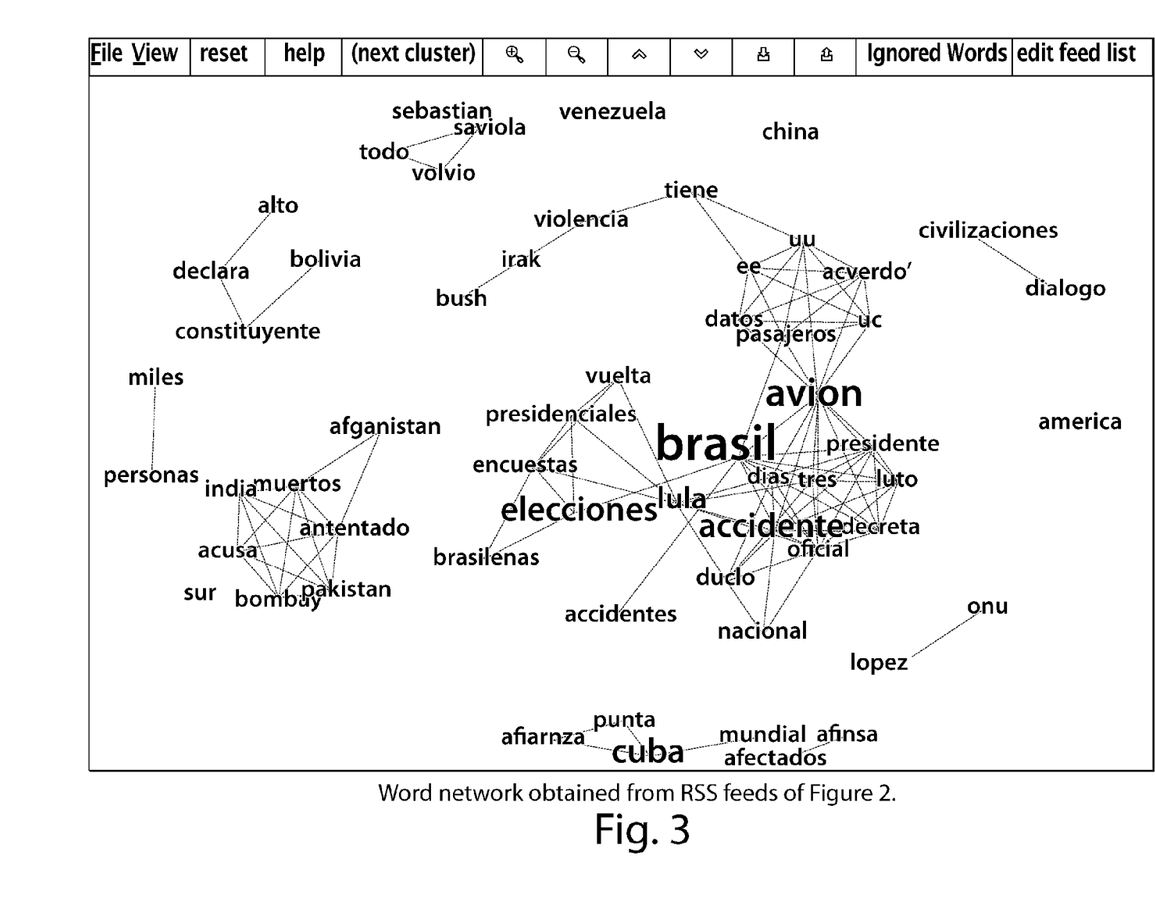
FIG. 3 illustrates an exemplary word network obtained from the RSS feeds of FIG. 2.

FIG. 1 illustrates an overview of one embodiment for the exemplary RSS feeds. In this embodiment the user has online access and wishes to have a quick overview of the world's news. The user defines a set of RSS feeds (FIG. 2) from selected news sites. The system gets the RSS feeds specified by the user, analyzes them and displays them in the aggregate as a word network (FIG. 3). It will be obvious to those skilled in the art that the same methods can be used for any other source of text data.

To display the text data from the sources the user has chosen (in the illustrative example the RSS feeds) as a network of words, the system executes the following tasks (the method):

(1) It goes through each source of text data, here each RSS feed, parses each source into words, and builds a statistical model of the words and relationships between words. To do so, it first cleans up the parsing by removing non-word characters and also all words that belong to a pre-specified list of stop-words. It then applies a bi/tri-gram extraction algorithm [Christopher D. Manning, Hinrich Schütze, *Foundations of Statistical Natural Language Processing*, MIT Press: 1999;] to identify multi-word expressions, that is, two or three words that always appear together. It then applies a stemming algorithm [Julie Beth Lovins (1968). Development of a stemming algorithm. Mechanical Translation and Computational Linguistics 11:22-31; Jaap Kamps, Christof Monz, Maarten de Rijke and Börkur Sigurbjörnsson (2004). Language-dependent and Language-independent Approaches to Cross-Lingual Text Retrieval. In: C. Peters, J. Gonzalo, M. Braschler and M. Kluck, eds. *Comparative Evaluation of Multilingual Information Access Systems*. Springer Verlag, pp. 152-165; Eija Airio (2006). Word normalization and decompounding in mono- and bilingual IR. Information Retrieval 9:249-271] to reduce variations in the occurrences of a word into a single word, e.g., car and cars will be reduced to a single word: car. It then counts the number of times each word appears in the sources. It then counts how many times any two words appear together in the same sentence, where a sentence is defined by the smallest ensemble of words between two points. Let $N_k$ be the number of times word k appears in the sources, and $N_{jk}=N_{kj}$ the number of times words j and k appear together in a sentence. Conditional frequencies are defined by $F(j/k)=N_{jk}/N_j$ and $F(k/j)=N_{jk}/N_k$.

The window in which two words j and k appear together does not have to be a sentence. It can be a paragraph or a window of fixed size W within a sentence or within a paragraph, a fast but semantic-less approach. We have found, however, that using the sentence as the window maintains some semantic information in the statistics without the great variability of paragraph length and its associated speed issues.

(2) Once the $N_k$ and $N_{jk}$ values have been computed for all words and pairs of words, the weights of words and links between words are computed. The weight, $W_k$, of word k is defined by $N_k/(\Sigma N_j)$. The weight of the link between words j and k, $W_{jk}$, is defined by $0.5*(F(j/k)+F(k/j))$. Other formulas can be used to compute $W_{jk}$. For example, if $H_{jk}=F(j/k)*F(k/j)$: $W_{jk}=SQRT(H_{jk})$; $W_{jk}=Log(1+H_{jk})$; $W_{jk}=H_{jk}*Log(1+H_{jk})$; $W_{jk}=(H_{jk}+(H_{jk}/max\_i\ H_{ki}))/2$; or others. A normalizing scheme is used after all $W_j$'s and $W_{jk}$'s have been computed, so all values of $W_j$'s and $W_{jk}$'s are recomputed to be within ranges that can handled by the graph, or word network, drawing algorithm.

(3) The word network (FIG. 3) is displayed as follows. The number of words N to be displayed can be pre-specified or specified by the user. The N most frequent words are selected for display and shown on a two-dimensional display with links between them. The location of a word k in the display depends on $N_k$ and all $N_{jk}$ for words j connected to k. The display algorithm assumes that the node representing word k has a mass of $W_k$ and is connected by springs to other nodes representing other words j with spring recall forces equal to $W_{jk}$. Similar methods are known to those familiar with the field [P. Eades, A Heuristic for Graph Drawing, Congressus Numerantium 42, 149-160, 1984; P. Eades and R. Tamassia, Algorithms for Drawing Graphs: An Annotated Bibliography," Technical Report CS-09-89, Department of Computer Science, Brown University 1989; Branke J. Dynamic graph drawing. In: Kaufmann M, Wagner D (Eds). Drawing Graphs: Methods and Models, Lecture Notes in Computer Science, Vol. 2025. Springer: Berlin, 2001; 228-246].

Figure 4:
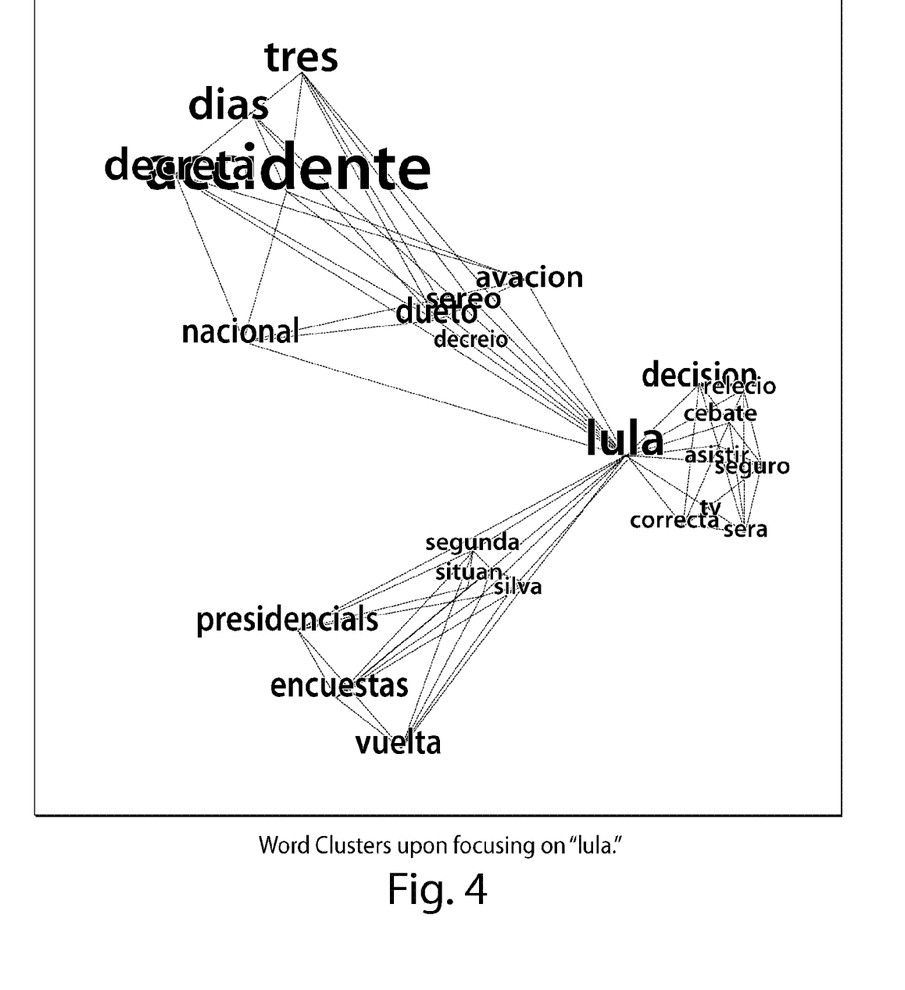
FIG. 4 illustrates an exemplary word network focused on a word.

Once the word network has been displayed, the user can tweak it by deleting words (the display is then recalculated), moving words with the mouse (or other device or method) and/or the user can focus on a word. When the user focuses on a word, the most frequent N−1 words that are connected to the focal word are displayed together with their links to the focal word and among themselves (FIG. 4). If there are fewer than N=1 words connected to the focal word, only those words connected to the focal word are displayed. If k is the focal word, word k may be anchored at a fixed location, and the network is displayed with the same individual word weights $W_j$ and with the same connection weights $W_{ij}$ for all j's other than k but with a new set of connection weights $W'_{jk}=F(k/j)$. These newly defined weights make words j that tend to appear with word k, which means that $W'_{jk}$ is close to 1, lie close to k in the network layout. Another option is to set all $W_{ij}$'s to 0 except for $W_{jk}$, that is, with only links to the focal word shown.

Figure 5:
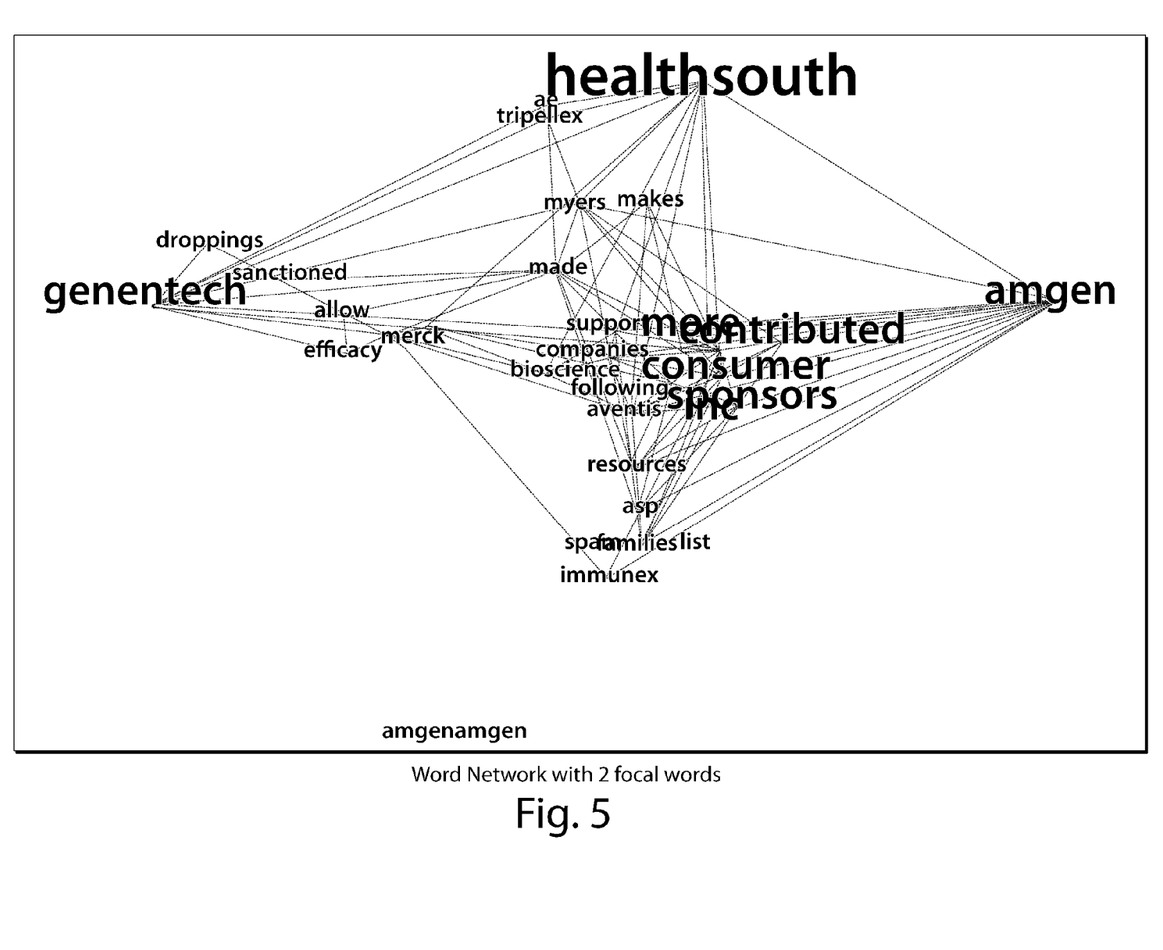
FIG. 5 illustrates an exemplary word network focused on multiple words.

The user can also select a second focal word (FIG. 5) (and a third, a fourth, etc.) and the most frequent N−2 words connected to the first or the second focal word or both are displayed with links to the focal words and among themselves. This method enables a user to compare the word networks of two words. For example, the user can compare the word networks of Toyota and Nissan in text data coming from car-oriented blogs, thereby getting an idea of the relative perception of Toyota and Nissan in the selected blogs. For FIG. 5, the focal words are Genentech and Amgen. The same method used for displaying a single focal is replicated for two or more focal words.

The user can also add a word of his/her choosing by writing a word directly into the display. If the user chooses to add a new word, the new word is treated as if it were a focal word and a word network is created as if the new word were a focal word: the most frequent N−1 words that are connected to the new word are displayed together with their links to the new word and among themselves. If there are fewer than N−1 words connected to the new word, only those words connected to the new word are displayed.

Figure 6A:
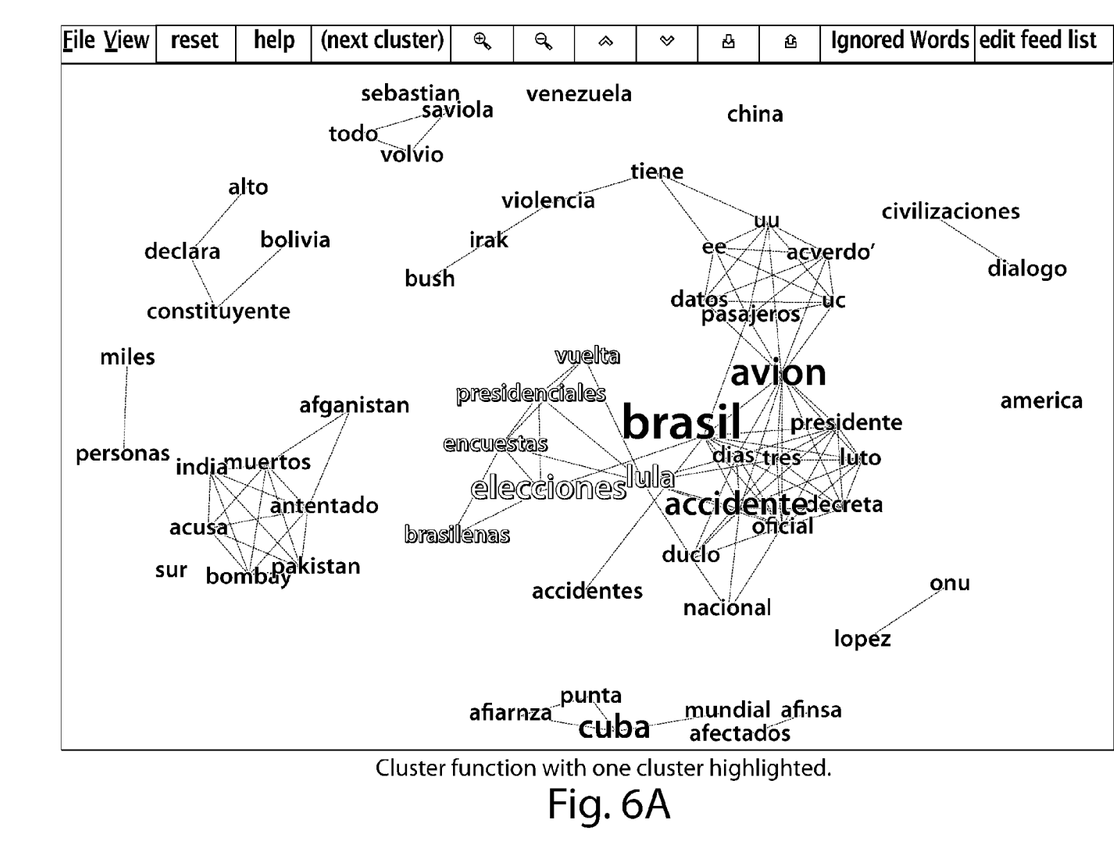
FIGS. 6A and 6B illustrate exemplary word networks with highlighted clusters.
Figure 6B:
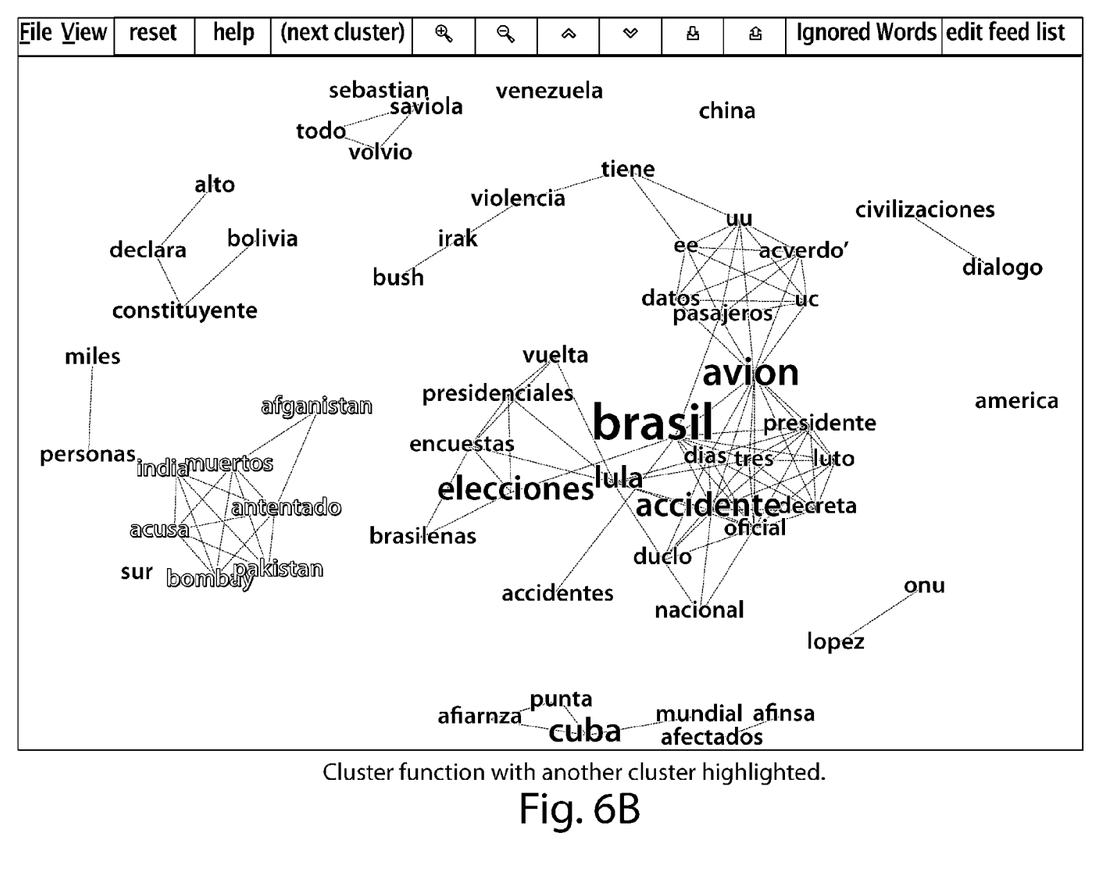

The user can also decide to examine if news topics emerge from the text data. Strongly connected clusters of words need to be identified. To do so, the system employs an algorithm inspired by the detection of communities in social networks [M. E. J. Newman, Detecting community structure in networks, European Journal of Physics B 38 (2004), 321-330; Fast algorithm for detecting community structure in networks, Physical Review E 69 (2004)]. FIGS. 6A and 6B each illustrate a highlighted cluster in a word network.

Figure 7A:
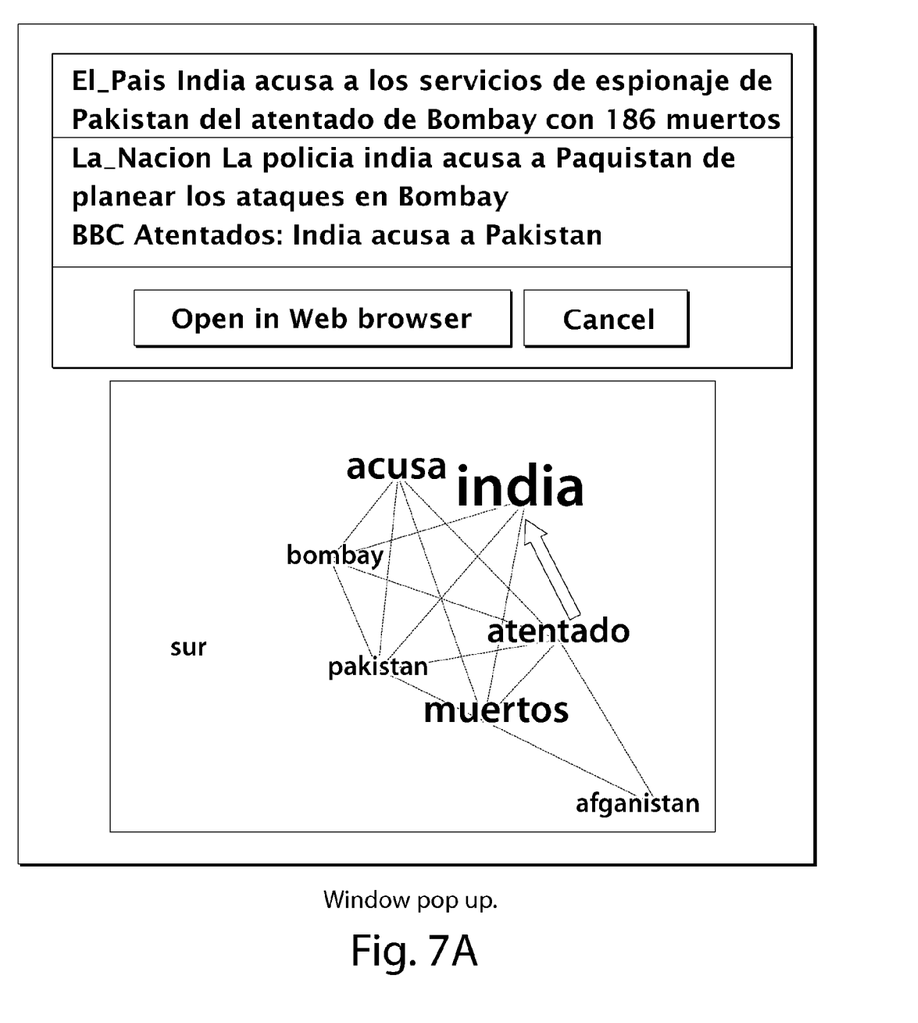
FIG. 7A illustrates an exemplary word network and a window listing articles related to a word chosen from the word network.
Figure 7B:
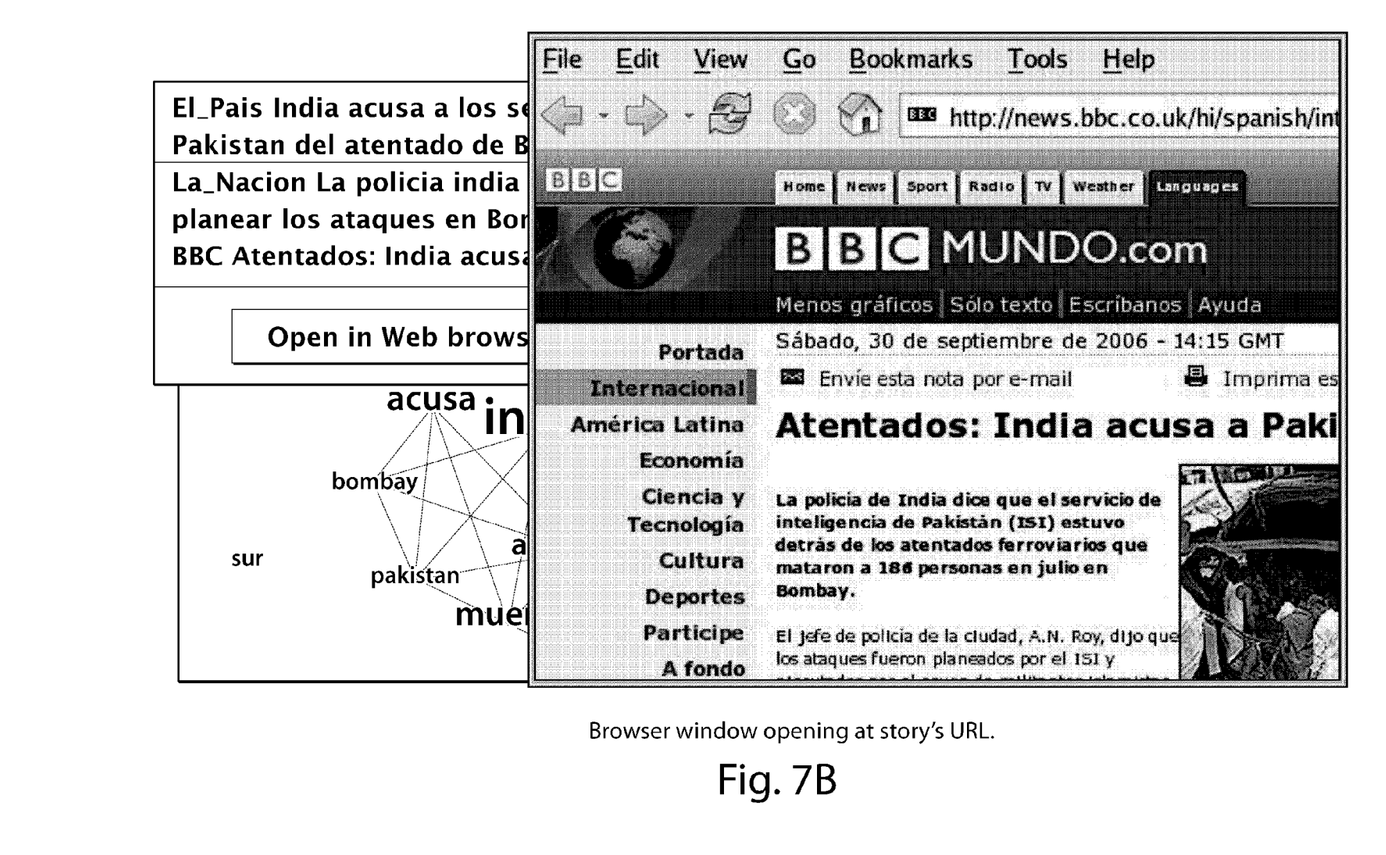
FIG. 7B additionally illustrates a browser window for a chosen article.

The user can also mouse-click on (or otherwise choose) a word and see the contexts in which the word appears. For the example of RSS feeds from news sites, the user sees a window that summarizes the locations (here, URLs) where the word appears, with the title of the corresponding news item (FIG. 7A). The user can then click on (or otherwise choose) one or more of the URLs displayed, which opens a browser with the URL address (FIG. 7B). As may be understood by those in the art, the contexts displayed and the links to the context sources may depend on the text data sources specified.

The methods and systems described herein are not limited to a particular hardware or software configuration, and may find applicability in many computing or processing environments. For example, the algorithms described herein can be implemented in hardware or software, or a combination of hardware and software. The methods and systems can be implemented in one or more computer programs, where a computer program can be understood to include one or more processor executable instructions. The computer program(s) can execute on one or more programmable processors, and can be stored on one or more storage medium readable by the processor (including volatile and non-volatile memory and/or storage elements), one or more input devices, and/or one or more output devices. The processor thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) is preferably implemented using one or more high level procedural or object-oriented programming languages to communicate with a computer system; however, the program(s) can be implemented in assembly or machine language, if desired. The language can be compiled or interpreted.

As provided herein, the processor(s) can thus be embedded in one or more devices that can be operated independently or together in a networked environment, where the network can include, for example, a Local Area Network (LAN), wide area network (WAN), and/or can include an intranet and/or the internet and/or another network. The network(s) can be wired or wireless or a combination thereof and can use one or more communications protocols to facilitate communications between the different processors. The processors can be configured for distributed processing and can utilize, in some embodiments, a client-server model as needed. Accordingly, the methods and systems can utilize multiple processors and/or processor devices, and the processor instructions can be divided amongst such single or multiple processor/devices.

The device(s) or computer systems that integrate with the processor(s) can include, for example, a personal computer(s), workstation (e.g., Sun, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor" or "the processor" can be understood to include one or more processors that can communicate in a stand-alone and/or a distributed environment(s), and can thus can be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network using a variety of communications protocols, and unless otherwise specified, can be arranged to include a combination of external and internal memory devices, where such memory can be contiguous and/or partitioned based on the application. Accordingly, references to a database can be understood to include one or more memory associations, where such references can include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, can include one or more intranets and/or the internet.

Although the methods and systems have been described relative to specific embodiments thereof, they are not so limited. Obviously many modifications and variations may become apparent in light of the above teachings and many additional changes in the details, materials, and arrangement of parts, herein described and illustrated, may be made by those skilled in the art.

The invention claimed is:

1. In a computer system having at least one user interface including at least one output device and at least one input device, a method comprising:
 a) receiving from a user through at least one input device an identification of at least one text source;
 b) from each said identified text source, retrieving at least one text passage;
 c) for each said retrieved text passage, parsing the said passage into words, identifying multi-word expressions in the said passage and applying a stemming algorithm to the said passage;
 d) for each word from the said text passages, determining a number of times the said word appears in the said passages; and
 e) causing to be displayed on an output device a predetermined number of words from the said text passages, wherein distances between the said predetermined number of words in a display on the said output device are determined at least in part by a word weight for each said displayed word and by a link weight for each pair of said displayed words, and wherein the word weight for each said displayed word is determined at least in part by a number of times the said word appears in the said passages; and
 wherein the link weight for each said pair of said displayed words is determined at least in part by the number of times each said word appears in the said passages and by a number of times the said word pair appears in a same window in the said passages; and
 wherein the method, further comprising receiving the said predetermined number from a user through at least one input device; and
 wherein the method further comprising
 f) receiving from a user an instruction to delete at least one word from the said display; and
 g) causing to be displayed on an output device the predetermined number of words from the said text passages without the at least one word which the said user instructed to be deleted;
 wherein distances between the said displayed words are determined at least in part by the word weight for each said displayed word and by the link weight for each pair of said displayed words, and
 wherein the word weight for each said displayed word is determined at least in part by a number of times the said word appears in the said passages; and
 wherein the link weight for each said pair of said displayed words is determined at least in part by the number of times each said word appears in the said passages and by a number of times the said word pair appears in a same window in the said passages.

2. In the computer system of claim 1, the method, further comprising, for each said retrieved text passage, removing at least one stop word from the said passage.

3. In the computer system of claim 1, the method, wherein the said same window is a sentence.

4. In the computer system of claim 1, the method, wherein the said same window is a paragraph.

5. A computer-readable medium having computer-readable instructions stored thereon which, as a result of being executed in a computer system having at least one user interface including at least one output device and at least one input device, instruct the computer system to perform a method, comprising:
 a) receiving from a user through at least one input device an identification of at least one text source;
 b) from each said identified text source, retrieving at least one text passage;
 c) for each said retrieved text passage, parsing the said passage into words, identifying multi-word expressions in the said passage and applying a stemming algorithm to the said passage;
 d) for each word from the said text passages, determining a number of times the said word appears in the said passages; and
 e) causing to be displayed on an output device a predetermined number of words from the said text passages, wherein distances between the said predetermined number of words in a display on the said output device are determined at least in part by a word weight for each said displayed word and by a link weight for each pair of said displayed words, and wherein the word weight for each said displayed word is determined at least in part by a number of times the said word appears in the said passages; and
 wherein the link weight for each said pair of said displayed words is determined at least in part by the number of times each said word appears in the said passages and by a number of times the said word pair appears in a same window in the said passages; and
 wherein the said instructions instruct the said computer system to perform the said method, further comprising, receiving the said predetermined number from a user through at least one input device; and
 wherein the said instructions instruct the said computer system to perform the said method, further comprising,
 f) receiving from a user an instruction to delete at least one word from the said display; and
 g) causing to be displayed on an output device the predetermined number of words from the said text passages without the at least one word which the said user instructed to be deleted;

wherein distances between the said displayed words are determined at least in part by the word weight for each said displayed word and by the link weight for each pair of said displayed words, and wherein the word weight for each said displayed word is determined at least in part by a number of times the said word appears in the said passages; and wherein the link weight for each said pair of said displayed words is determined at least in part by the number of times each said word appears in the said passages and by a number of times the said word pair appears in a same window in the said passages.

6. The computer-readable medium of claim 5, wherein the said instructions instruct the said computer system to perform the said method, further comprising, for each said retrieved text passage, removing at least one stop word from the said passage.

7. The computer-readable medium of claim 5, wherein the said same window is a sentence.

8. The computer-readable medium of claim 5, wherein the said same window is a paragraph.

* * * * *